US011466621B2

(12) United States Patent
Ribarov

(10) Patent No.: US 11,466,621 B2
(45) Date of Patent: Oct. 11, 2022

(54) ADAPTIVE THERMAL MANAGEMENT SYSTEM FOR AIRCRAFT FUEL SYSTEM

(71) Applicant: United Technologies Corporation, Farmington, CT (US)

(72) Inventor: Lubomir A. Ribarov, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 261 days.

(21) Appl. No.: 16/816,651

(22) Filed: Mar. 12, 2020

(65) Prior Publication Data
US 2020/0355119 A1 Nov. 12, 2020

Related U.S. Application Data

(60) Provisional application No. 62/820,987, filed on Mar. 20, 2019.

(51) Int. Cl.
*F02C 7/224* (2006.01)
*F02C 9/28* (2006.01)
(Continued)

(52) U.S. Cl.
CPC ............. *F02C 7/224* (2013.01); *F02C 7/14* (2013.01); *F02C 7/232* (2013.01); *F02C 9/28* (2013.01);
(Continued)

(58) Field of Classification Search
CPC .. F02C 7/14; F02C 7/224; F02C 7/232; F02C 9/26; F02C 9/263; F02C 9/28; F02C 9/48;
(Continued)

(56) References Cited

U.S. PATENT DOCUMENTS 3,818,760 A * 6/1974 Howard ................ G01F 23/808
73/304 C
3,864,609 A * 2/1975 Di Giacomo ............ H01G 4/04
361/280
(Continued)

FOREIGN PATENT DOCUMENTS

EP 2713027 A2 4/2014
EP 3540196 A1 9/2019

OTHER PUBLICATIONS

European Search Report for European Application No. 20163434.2 dated Jul. 31, 2020.

*Primary Examiner* — William H Rodriguez
(74) *Attorney, Agent, or Firm* — Carlson, Gaskey & Olds, P.C.

(57) ABSTRACT

An adaptive thermal management system for a gas turbine engine includes a heat exchanger transferring heat into a coolant, a temperature sensor measuring a temperature of the coolant, and a sensor assembly that measures a parameter of the coolant during operation of the gas turbine engine. The parameter measured by the sensor assembly is indicative of a capacity of the coolant to accept heat from the hot flow. A control valve governs a flow of coolant into the heat exchanger. A controller adjusts the control valve to communicate coolant to the heat exchanger based on a determined capacity of the coolant to accept heat in view of the measured temperature of the coolant and that the measured parameter of the coolant is within a predefined range.

18 Claims, 4 Drawing Sheets

(51) Int. Cl.
*F02C 7/232* (2006.01)
*F02C 7/14* (2006.01)
*H01S 5/042* (2006.01)
*H01S 5/183* (2006.01)
*H01S 5/30* (2006.01)
*H01S 5/343* (2006.01)
*H01S 5/20* (2006.01)

(52) U.S. Cl.
CPC ............... *F05D 2260/213* (2013.01); *F05D 2270/3062* (2013.01); *H01S 5/0421* (2013.01); *H01S 5/18305* (2013.01); *H01S 5/18344* (2013.01); *H01S 5/18369* (2013.01); *H01S 5/209* (2013.01); *H01S 5/3054* (2013.01); *H01S 5/3095* (2013.01); *H01S 5/34366* (2013.01)

(58) Field of Classification Search
CPC ............... F02C 9/50; F05D 2260/213; F05D 2270/3062
See application file for complete search history.

(56) References Cited

U.S. PATENT DOCUMENTS

| | | | |
|---|---|---|---|
| 4,041,697 A * | 8/1977 | Coffinberry | F02C 7/14 |
| | | | 60/39.281 |
| 4,263,786 A * | 4/1981 | Eng | B64D 13/06 |
| | | | 62/89 |
| 4,505,124 A | 3/1985 | Mayer | |
| 5,207,099 A * | 5/1993 | Baker | G01F 23/804 |
| | | | 73/304 R |
| 9,048,689 B2 | 6/2015 | Bosson et al. | |
| 9,354,621 B2 | 5/2016 | Westervelt et al. | |
| 2011/0185731 A1* | 8/2011 | Mylemans | F02C 7/224 |
| | | | 60/645 |
| 2013/0086909 A1* | 4/2013 | Wang | F02C 7/14 |
| | | | 60/730 |
| 2013/0202406 A1 | 8/2013 | Papa et al. | |
| 2014/0341256 A1* | 11/2014 | Azeem | G01K 3/08 |
| | | | 374/165 |
| 2015/0375868 A1 | 12/2015 | Smith et al. | |
| 2017/0058774 A1* | 3/2017 | Pickford | F02C 7/224 |
| 2018/0215479 A1* | 8/2018 | Logan | F02C 7/224 |
| 2019/0063321 A1* | 2/2019 | Morioka | F02C 7/32 |
| 2019/0277201 A1* | 9/2019 | Veilleux, Jr. | B64D 37/32 |
| 2019/0338706 A1* | 11/2019 | Mastrocola | B64D 37/34 |
| 2021/0172375 A1* | 6/2021 | Bosak | F04B 49/007 |

* cited by examiner

ADAPTIVE THERMAL MANAGEMENT SYSTEM FOR AIRCRAFT FUEL SYSTEM

CROSS-REFERENCE TO RELATED APPLICATIONS

This application claims priority to U.S. Provisional Application No. 62/820,987 which was filed on Mar. 20, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Fuel is utilized as a coolant for cooling other engine systems. Implementation of additional electric devices including motors, controllers, avionics, and other devices aboard the aircraft and as part of the engine increases overall heat loads. The capacity of the fuel to absorb heat from other systems is limited. At increased temperatures, the fuel begins to degrade and break-down potentially resulting in accumulation of deposits on parts of the fuel system. Accordingly, there is a limit to the amount of heat that can be absorbed by the fuel. Moreover, current thermal management systems are designed for worst case heat loads that occur only during portions of an engine operating cycle. Thermal management systems are not actively operated for adapting to dynamically changing operating conditions.

Turbine engine manufacturers continuously seek improvements to engine performance including improvements to thermal, power transfer, and propulsive efficiencies.

SUMMARY

An adaptive thermal management system for a gas turbine engine according to an exemplary embodiment of this disclosure includes, among other possible things, a heat exchanger transferring heat into a coolant, a temperature sensor measuring a temperature of the coolant, and a sensor assembly that measures a parameter of the coolant during operation of the gas turbine engine. The parameter measured by the sensor assembly is indicative of a capacity of the coolant to accept heat from the hot flow. A control valve governs a flow of coolant into the heat exchanger.

A controller adjusts the control valve to communicate coolant to the heat exchanger based on a determined capacity of the coolant to accept heat in view of the measured temperature of the coolant and that the measured parameter of the coolant is within a predefined range.

In a further embodiment of the foregoing adaptive thermal management system for a gas turbine engine, the coolant comprises fuel from a fuel system, the fuel system including a fuel tank holding a mass of fuel and at least one fuel pump communicating fuel to the heat exchanger.

In a further embodiment of any of the foregoing adaptive thermal management systems for a gas turbine engine, the sensor assembly comprises a fuel mass sensor that measures a fuel mass within the fuel tank.

In a further embodiment of any of the foregoing adaptive thermal management systems for a gas turbine engine, the sensor assembly comprises an oxygen sensor measuring an oxygen content within the fuel.

In a further embodiment of any of the foregoing adaptive thermal management systems for a gas turbine engine, the controller is configured to utilize a current engine operating condition in determining the capacity of the coolant to accept heat.

In a further embodiment of any of the foregoing adaptive thermal management systems for a gas turbine engine, the controller is configured to utilize a current ambient operating condition in determining the capacity of the coolant to accept heat.

In a further embodiment of any of the foregoing adaptive thermal management systems for a gas turbine engine, the controller is configured to stop flow of coolant to at least one heat generating system in response to the capacity of the coolant or accepting heat being outside the predefined range.

A gas turbine engine according to an exemplary embodiment of this disclosure includes, among other possible things, a fan rotatable within a fan nacelle, and a core engine includes a compressor that communicates compressed air to a combustor where compressed air is mixed with fuel and ignited to generate a high-energy gas flow expanded through a turbine. A fuel system includes a fuel tank containing a mass of fuel and a fuel pump for generating a fuel flow. A heat exchanger receives a portion of fuel flow for transferring heat from at least one heat generating system into the fuel flow. A temperature sensor measures a temperature of the fuel. A sensor assembly measures a parameter of the fuel during operation of the gas turbine engine, and the parameter is measured by the sensor assembly and is indicative of a capacity of the fuel to accept heat. A control valve governs a flow of fuel into the heat exchanger, and a controller adjusts the control valve to communicate fuel flow to the heat exchanger based on a determined capacity of the fuel to accept heat in view of the measured temperature of the fuel and that the measured parameter of the fuel is within a predefined range.

In a further embodiment of the foregoing gas turbine engine, the measured parameter comprises an oxygen content of the fuel flow and the mass of fuel within the fuel tank.

In another embodiment of any of the foregoing gas turbine engines, the temperature sensor comprises a first temperature sensor measuring a temperature of the fuel mass within the fuel tank and a second temperature sensor measuring a temperature of fuel flow downstream of the fuel tank. A difference between a temperature of the fuel mass and the fuel flow is indicative of the capacity of the fuel to accept heat.

In another embodiment of any of the foregoing gas turbine engines, the controller is configured to utilize a current engine operating condition in determining the capacity of the fuel to accept heat.

In another embodiment of any of the foregoing gas turbine engines, the controller is configured to stop flow of fuel to at least one heat generating system in response to the capacity of the fuel for accepting heat being outside the predefined range.

A method of actively managing thermal loads according to exemplary embodiment of this disclosure includes, among other possible things, measuring a current temperature of a coolant during operation of a gas turbine engine, and measuring another parameter of the coolant in addition to the current temperature of the coolant during operation of the gas turbine engine. If the measured parameter is determined to be within a predefined range in view of the measured temperature that is indicative of a capacity of the coolant to accept additional heat input, heat is transferred into the coolant in response to the measured parameter being within the predefined range in view of the measured temperature.

In a further embodiment of the foregoing method of actively managing thermal loads, the coolant comprises a fuel supplied to a combustor of the gas turbine engine through a fuel system and a portion of a flow of fuel is routed through a heat exchanger for transferring heat from another system into the fuel.

In another embodiment of any of the foregoing methods of actively managing thermal loads, the measured parameter comprises an oxygen content within the fuel.

In another embodiment of any of the foregoing methods of actively managing thermal loads, the measured parameter comprises a fuel mass contained within the fuel system.

In another embodiment of any of the foregoing methods of actively managing thermal loads, a time is determined in a flight cycle and the predefined range is adjusted in view of the determined time in the flight cycle.

In another embodiment of any of the foregoing methods of actively managing thermal loads, a heat load of a heat generating system is determined and a portion of the heat load is transferred to the coolant in response to a determination that the coolant has additional capacity for accepting heat without exceeding a predefined temperature.

In another embodiment of any of the foregoing methods of actively managing thermal loads, a transfer of heat into the coolant is stopped in response to a determination that the measured parameter is outside of the predefined range indicating that the coolant does not have a sufficient capacity to accept additional heat.

In another embodiment of any of the foregoing methods of actively managing thermal loads, the measured parameter is monitored and the transfer of heat into the coolant in response to the measured parameter being within the predefined range indicating the coolant has some capacity to accept additional heat is reinitiated.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
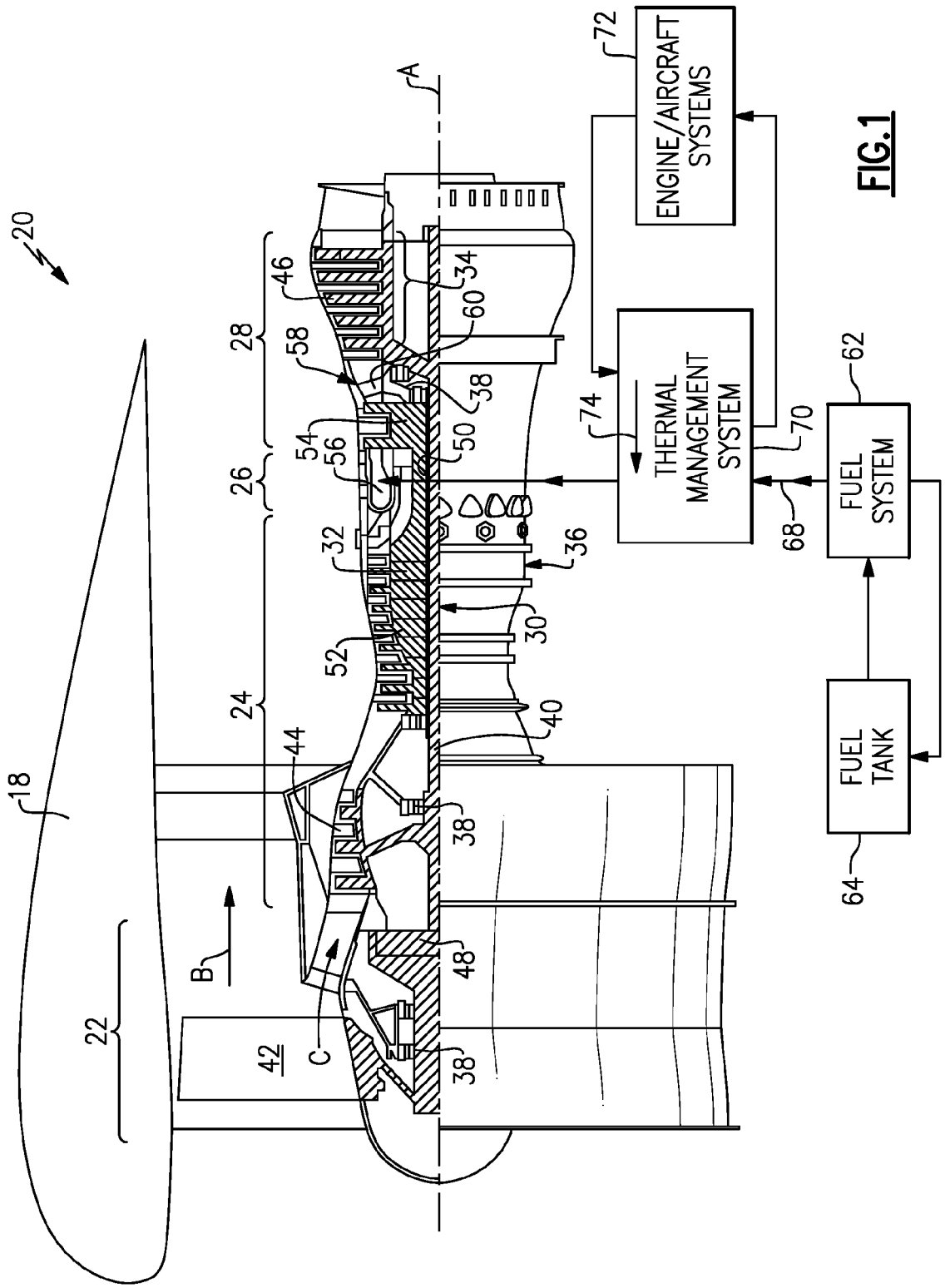
FIG. 1 is a schematic view of an example gas turbine engine.

FIG. 1 schematically illustrates a gas turbine engine 20 for powering an aircraft. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6:1), with an example embodiment being greater than about ten (10:1), the geared architecture 48 is an epicyclic gear train, such as a planetary gear system or other gear system, with a gear reduction ratio of greater than about 2.3 and the low pressure turbine 46 has a pressure ratio that is greater than about five (5:1). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about (1.45:1). "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/s (350.5 m/s).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 5 turbine rotors schematically indicated at 34. In another disclosed embodiment, the low pressure turbine includes about 6 rotors. In another non-limiting example embodiment, the low pressure turbine 46 includes about 3 turbine rotors. In yet another disclosed embodiment, the number of turbine rotors for the low pressure turbine 46 may be between 3 and 6. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Fuel is delivered to the combustor 56 by a fuel system 62. The fuel is utilized as a heat sink to cool other engine and aircraft systems schematically shown at 72. The fuel system 62 draws fuel from a fuel tank 64 and generates a fuel flow 68. Although one fuel tank 64 is shown in FIG. 1, it is to be understood that there may be multiple (more than one) fuel tanks onboard an aircraft. The fuel flow 68 is communicated to a thermal management system 70 that uses the fuel as a heat sink to absorb thermal energy from the other systems 72. Thermal energy, schematically indicated by arrow 74 is transferred into the fuel flow 68 to maintain the engine and aircraft systems 72 at desirable operating temperatures. The thermal energy heats the fuel that is communicated into the combustor 56 where it is mixed with high pressure air and ignited to release energy used to drive the turbine section 28. The heated fuel improves the overall thermodynamic efficiency of the gas turbine engine 20.

The ability of the fuel to accept heat is limited because at certain temperatures, the fuel decomposes and begins forming solid deposits that can impede proper functioning of components of the fuel system 62. It is well understood that aircraft fuels degrade as fuel temperatures approach about 300° F. (149° C.). Various operating parameters can alter the temperature at which degradation of the fuel begins and therefore may alter the capacity for the fuel to absorb thermal energy.

Figure 2:
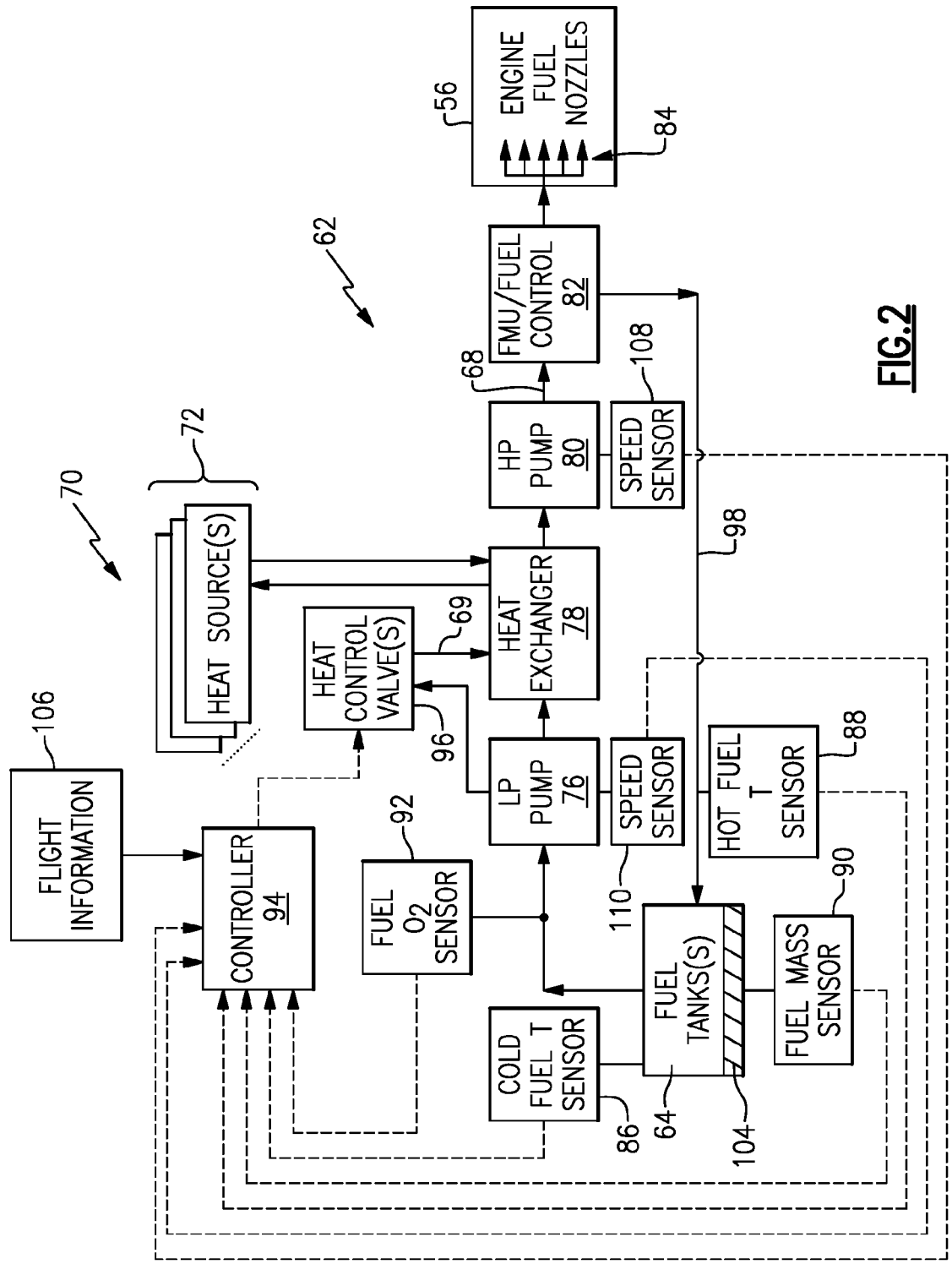
FIG. 2 is a schematic view of an example fuel system and thermal management system embodiment.

Referring to FIG. 2, with continued reference to FIG. 1, a disclosed thermal management system 70 and fuel system 62 are shown schematically. The disclosed thermal management system 70 operates to adapt transference of thermal energy into the fuel based on a determined capacity of the fuel to accept heat.

The fuel system 62 includes the fuel tank 64 that holds a fuel mass 104. A low pressure pump 76 draws fuel from the tank 64 and communicates the fuel flow to a heat exchanger 78 and to a high pressure pump 80. The high pressure pump 80 generates the fuel flow 68 at a defined pressure that is metered out by a fuel control 82 to fuel nozzles 84 of the combustor 56. The pressure and flow rate of fuel to the combustor 56 is provided at higher pressures than fuel flow 68 at upstream parts of the fuel system 62 in order to be compatible with higher pressures within the combustor 56 (as well as to allow for proper fuel atomization and mixing with air in the combustor prior to ignition and combustion).

The heat exchanger 78 places a fuel flow 69 in thermal communication with other flows from other systems 72. The fuel flow 69 is upstream of the high pressure pump 80 and is therefore of a lower pressure than the fuel flow 68. The other systems 72 may include engine lubrication systems, hydraulic systems or coolant systems. The coolant systems may provide cooling of aircraft equipment such as avionic instruments and environmental control devices within the aircraft and separate from the engine 20. It should be appreciated that although a single heat exchanger 78 is shown by way of example, a number of heat exchangers may be utilized to accommodate the thermal loads of each system or group of systems 72.

The thermal management system (TMS) 70 monitors parts of the fuel system 62 to gather information utilized to determine the capacity of the fuel to accept heat at a given time during aircraft and engine operation. The TMS 70 uses the determination of capacity of the fuel to accept heat to adjust and adapt operation to current conditions.

The example TMS 70 embodiment includes a controller 94 that is in communication with sensors disposed throughout the fuel system 62. In one disclosed example, a first temperature sensor 86 measures a temperature of fuel within the fuel tank 64. A mass sensor 90 is also disposed within the fuel tank 64 to communicate information indicative of a quantity of fuel. A second temperature sensor 88 is disposed at another location that senses a temperature within the fuel system 62. In this disclosed embodiment, the temperature sensor 88 measures a temperature of fuel within a recirculation passage 98. An oxygen sensor 92 is also disposed near the fuel tank 64 to provide information on changes to oxygen content within the fuel. Speed sensors 108 and 110 provide additional information to the controller 94 that can be utilized to provide information about current engine fuel consumption. As appreciated, other sensor types and additional sensors may be utilized in different locations to provide information to the controller 94 and are within the contemplation and scope of this disclosure.

The controller 94 uses the information obtained from the fuel system 62 to determine an actual capacity of the fuel to absorb heat. The actual capacity changes during engine and aircraft operation and therefore determining the current actual capacity based on information gathered regarding actual and current fuel system operation enables control and adaptation of heat transfer in view of changing thermal conditions. The example controller 94 operates control valves 96 to control the fuel flow to various heat exchangers transferring heat produced by the systems 72. The multiple valves 96 correspond with each system 72, group of systems 72 and/or parts of each system 72. The different control valves 96 enable the controller 94 to tailor thermal transfer to actual engine operating conditions. Each of the control valves 96 maybe on/off valves or proportional valves as may be best suited for each of the systems 72.

Figure 3:
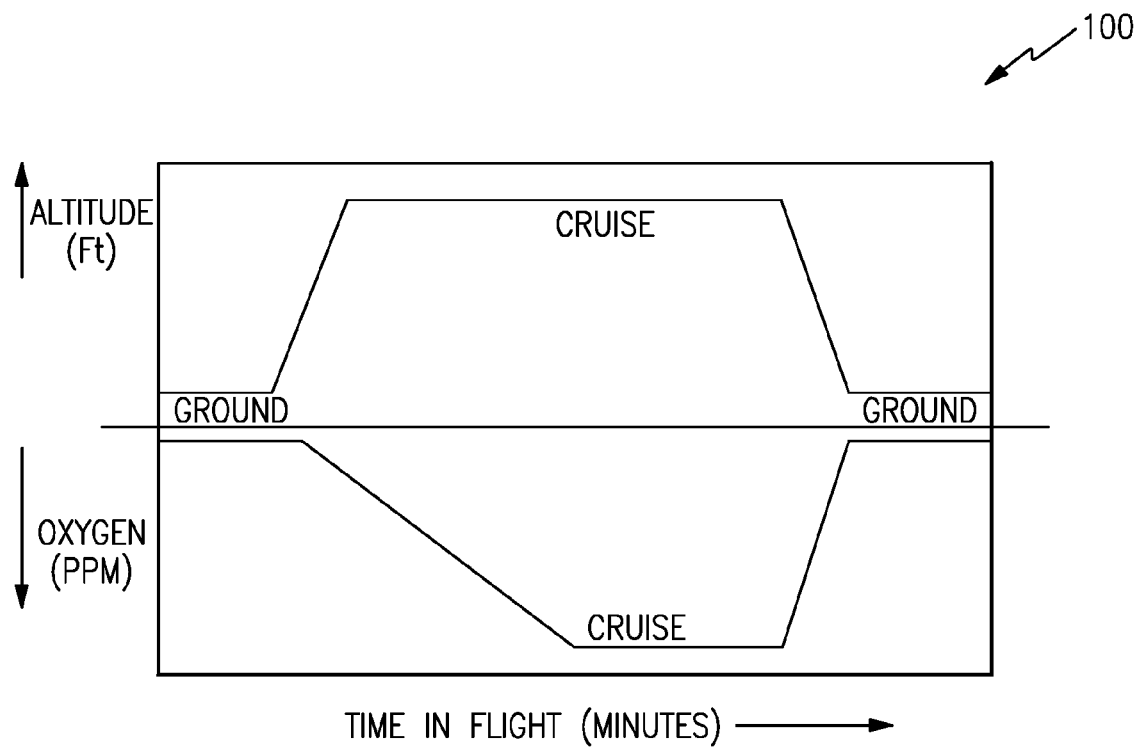
FIG. 3 is a graph illustrating a relationship between flight profile and ambient oxygen content.

Referring to FIG. 3, with continued reference to FIG. 2, the specific temperature where fuel degradation begins is dependent, in part, by the amount of dissolved oxygen present within the fuel. The more dissolved oxygen the lower the temperature at which fuel degradation is likely to occur. As the amount of dissolved oxygen within the fuel decreases, the temperature at which fuel degradation is likely increased, thereby also increasing the capacity of the fuel to accept heat from other systems 72. Accordingly, the controller 94 of the example TMS 70 determines the available thermal mass of the on-board fuel, and the measured amount of dissolved oxygen in the fuel, for a given altitude, time, and fuel temperature to determine the capacity of the fuel to accept heat from the other systems without degrading.

The amount of dissolved oxygen changes during aircraft operation as is schematically shown in graph 100. As the aircraft climbs, the ambient air decreases in temperature, pressure, and oxygen content. The fuel tank 64 is vented to ambient and therefore, the current ambient air conditions alter the condition of the fuel mass 104 in the fuel tank 64. At higher altitudes, less ambient oxygen is present and therefore less oxygen dissolves into the fuel. Additionally, higher altitudes with less ambient oxygen (and lower ambient air pressure) encourage increased degassing of the dissolved oxygen from the fuel to further reduce the amount of dissolved oxygen within the fuel.

As shown in graph 100, at the beginning and end of flight profile while on the ground and climbing to cruise altitude, the amount of ambient oxygen is relatively high. During cruise conditions, the amount of ambient oxygen is low and thereby results in lower dissolved oxygen content within the fuel. The combined effects of lower ambient air pressure and the increased degassing of oxygen from the fuel result in a much lower oxygen content in the fuel. The lower oxygen content enables operation of the fuel at higher temperatures without degradation and therefore increases the thermal capacity of the available fuel on-board the aircraft. Accordingly, the controller 94 uses flight information 106 (FIG. 2) that indicates the current point in the flight profile as well as the information of the oxygen sensor 92 to determine the thermal capacity of the fuel.

Figure 4:
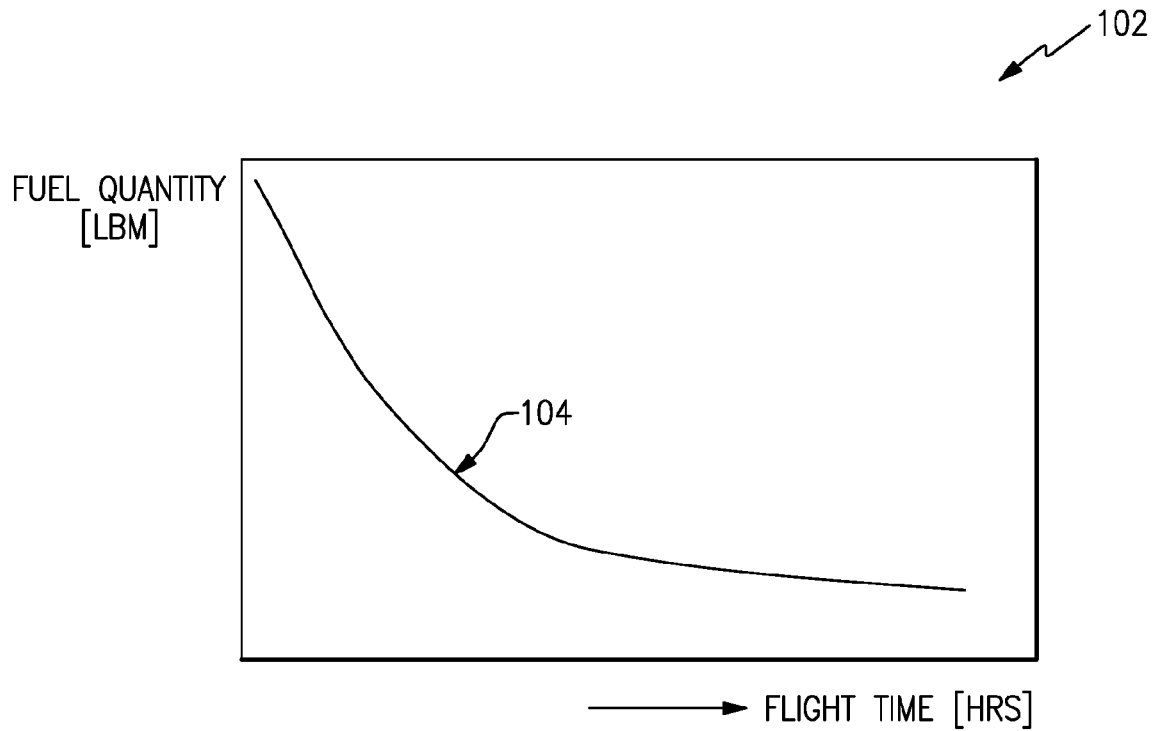
FIG. 4 is a graph illustrating a relationship between fuel mass and time within a flight profile.

Referring to FIG. 4, with continued reference to FIGS. 2 and 3, the controller 94 also uses information pertaining to fuel mass and fuel temperature to determine the thermal capacity of the fuel that is known as fuel thermal mass. Graph 102 illustrates how the fuel mass 104 decreases during a flight cycle. The decrease in fuel mass 104 decreases the overall system capacity to accept thermal energy and therefore reduces the fuel thermal mass. Less fuel results in an increased recirculation rate, which, in turn, reduces cooling time and leads to an overall increase of fuel temperature. The disclosed TMS 70 monitors the available fuel mass 104 at all times during the flight cycle. The fuel mass 104 includes the fuel that is presently available in the fuel tank 64 during any phase of the flight cycle.

Another factor affecting the thermal capacity of the fuel is a difference in fuel temperature at different locations in the fuel system 62. In one disclosed embodiment the temperature difference is determined between the temperature obtained from the first temperature sensor 86 in the fuel tank and the second temperature sensor 88 disposed in the recirculation passage 98. The difference between the temperature in the fuel tank 64 and the temperature in the passage 98 indicates a quantity of thermal energy that has been absorbed by the fuel flows 69 and 68. The greater the difference in temperature, the greater amount of thermal capacity available.

Another operational parameter utilized to estimate the instant thermal capacity of the fuel is a rate of fuel consumption. Fuel is continuously consumed during a typical flight cycle, reducing the available fuel mass 104. The decreasing fuel mass 104 limits the available thermal capacity. Moreover, onboard heat loads vary, increasing and decreasing at different times during a typical flight cycle. Accordingly, the temperature of the fuel mass 104 fluctuates with the varying deposits of waste heat into the fuel. Heat loads can be steady-state or transient, which vary with different engine and aircraft operation at different points in the flight cycle. The transient heat loads are in addition to systems that reach "steady-state" heat loads during engine operation. The lubrication system is an example of a system that reaches a substantial steady-state condition during engine operation. Despite engine speed variations, the heat load from cooling lubricant remains approximately constant through the entire flight cycle. Variable heat loads can be from systems that vary with the flight cycle such as avionic equipment, environmental controls systems and other aircraft and engine systems operating either during steady-state conditions or transient conditions.

The disclosed system monitors the rotational speed of the fuel pumps 76, 80 with speed sensors 110 and 108, respectively (as shown in FIG. 2). The speed of the fuel pumps 76, 80 is an accurate indicator of actual fuel consumption. The rotational acceleration of the fuel pumps 76, 80 may also be monitored to provide an accurate indication of anticipated fuel consumption. Based on the flight cycle, the change in rotational acceleration of the fuel pumps 76, 80 can indicate an increase or a decrease in anticipated fuel consumption. No change in rotational acceleration of the fuel pumps 76, 80 indicates a steady-state level cruise flight condition with a corresponding steady-state fuel consumption. Combining data obtained throughout the fuel system 62 including the fuel mass 104 in the tank 64, fuel temperature differences, dissolved oxygen content as well as differences in ambient air temperature provide for the determination of the available fuel thermal mass at any given time during flight operation.

Figure 5:
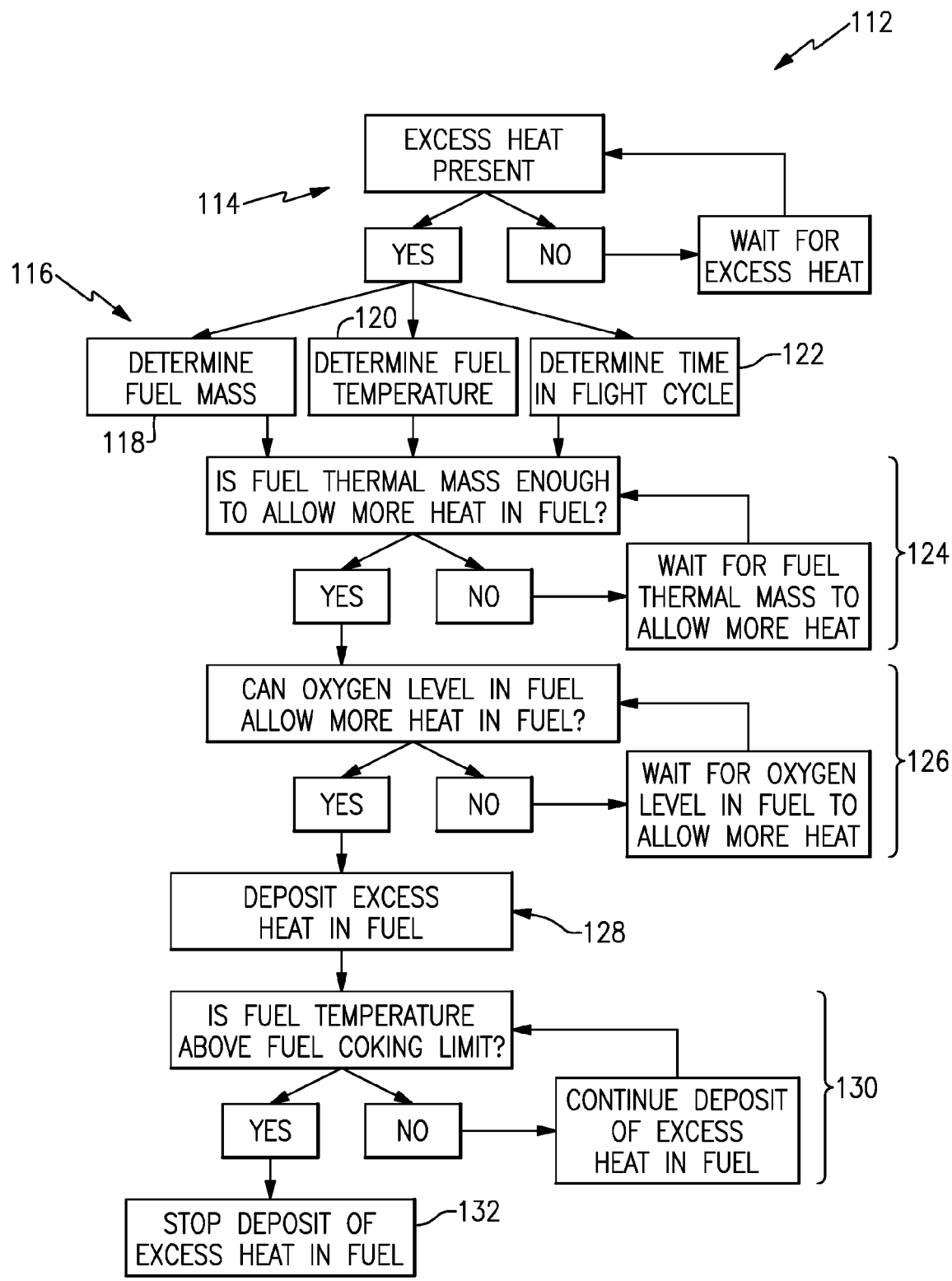
FIG. 5 is a flow diagram schematically illustrating operation of an example thermal management system embodiment.

Referring to FIG. 5, with continued reference to FIG. 2, a diagram illustrating one disclosed method of actively managing thermal loads by operation of the disclosed thermal management system is schematically indicated at 112. The initial step indicated at step 114 is the recognition that excess heat is present in one of the systems 72. The recognition can be evaluated and determined for each individual system 72. Each system 72 operates at predefined temperature limits and ranges. Upon recognition that one of the systems 72 requires additional heat removal, the TMS 70 determines if additional fuel thermal capacity is available. The determination as to whether sufficient fuel thermal capacity is available includes the preliminary determination of the parameters utilized to estimate and/or determine the available thermal capacity. In this disclosed example, at step 116, fuel mass 104 is determined as shown at 118, fuel temperature is obtained as indicated at 120, and the point within the flight cycle is determined 122. The point within the flight cycle 122 may include an elapsed time from the beginning of flight, a percentage of distance of a total flight distance and/or a percentage of time elapsed of a total expected flight time. Moreover, the point in the flight cycle 122 may also be determined in other manners understood to those skilled in the art and are within the contemplation and scope of this disclosure. As appreciated, each of these parameters may be continuously monitored, or checked in response to a demand for additional heat transfer is recognized.

The controller 94 makes the determinations as part of the operating method of the disclosed TMS 70. The controller 94 may be a separate controller for the TMS 70 or part of the overall engine or aircraft controller (EEC/FADEC). The controller 94 as referred to in this disclosure may be a hardware device for executing software, particularly software stored in memory. The controller may include a processor. The processor may be custom made or a commercially available processor, a central processing unit (CPU), an auxiliary processor among several processors associated with the computing device, a semiconductor based microprocessor (in the form of a microchip or chip set) or generally any device for executing software instructions.

The controller 94 will include a memory that can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory. Moreover, the controller 94 may be of any configuration understood and known to perform the required determination utilizing received information from the fuel system 62 and remain within the contemplation and scope of this disclosure.

In this disclosed example, the fuel thermal mass is determined and analyzed as indicated at step 124 to determine if sufficient fuel thermal mass is present to accommodate that additional heat input. The determination of sufficient fuel thermal mass would be made based on predefined ranges that provide guidance for what fuel thermal mass is sufficient to accommodate the heat load. If the determination is that sufficient fuel thermal mass is present, in view of the other determined factors, a determination as to the dissolved oxygen content in the fuel is determined as indicated at step 126. If the determination as to sufficient fuel thermal mass is negative, the system will not begin further heat transfer. Instead, the TMS 70 may simply wait until conditions are acceptable within predefined limits.

Upon a determination that the oxygen content is within acceptable limits as indicated at step 126, the controller 94 will adjust the control valves 96 to direct fuel flow to accept heat from one of the specific system 72. The acceptable limits of the oxygen content of the fuel are indicative of a temperature at which degradation of the fuel may begin. The valves 96 may communicate the fuel flow 69 to a heat exchanger corresponding with a specific system and/or communicate a hot flow from one of the systems 72 to the heat exchanger 78. Whatever the specific configuration, the controller 94 coordinates actuation of the valves 96 to place the cooling fuel flow in thermal communication with the hot flow.

The TMS 70 will monitor thermal transfer and the fuel in the fuel system 62 to assure that the fuel temperature does not exceed predefined temperature limits as indicated at step 128. The temperature limits may vary depending on the sensed parameters of the fuel including oxygen content, fuel mass, and temperature differences. Accordingly, based on all the monitored parameters, the temperature limit where fuel degradation is likely is constantly adjusted and adapted to current operating conditions to more efficiently utilize the thermal capacity of the fuel. Moreover, the temperature limit may also include a forward looking estimate that factors in the time in the current flight profile thus providing an anticipatory adaptive capability of the TMS 70.

As appreciated, when nearing the end of a cruise flight time, and the beginning of the descend phase of the flight profile, the TMS 70 may recognize that an increase in dissolved oxygen content within the fuel that will reduce the fuel thermal capacity is eminent and use this information in the determination of when to stop accepting heat into the fuel as is indicated at step 130. In addition, this determination is reached by using other inputs such as the mass- and the temperature of the available fuel. The TMS 70 will ultimately stop the introduction of additional heat into the fuel as indicated at step 132 once the predefined limits of the thermal capacity of the fuel have been reached. The process and operation of the TMS 70 would return to the initial determination at step 114 and begin accepting additional heat (if additional excess heat is present in one of the systems 72) once the fuel thermal capacity returns to acceptable limits.

Accordingly, the disclosed TMS 70 measures actual thermal capacity of the fuel and adjusts heat transfer to efficiently utilize full thermal capacity for changing operational conditions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An adaptive thermal management system for a gas turbine engine comprising:
   a heat exchanger transferring heat into a coolant;
   a temperature sensor measuring a temperature of the coolant;
   a sensor assembly measuring a parameter of the coolant during operation of the gas turbine engine, the parameter measured by the sensor assembly is indicative of a capacity of the coolant to accept heat;
   a control valve governing a flow of coolant into the heat exchanger; and a controller adjusting the control valve to communicate coolant to the heat exchanger based on a determined capacity of the coolant to accept heat in view of the measured temperature of the coolant and that the measured parameter of the coolant is within a predefined range wherein the coolant comprises fuel from a fuel system, the fuel system including a fuel tank holding a mass of fuel and at least one fuel pump communicating fuel to the heat exchanger.

2. The adaptive thermal management system as recited in claim 1, wherein the sensor assembly comprises a fuel mass sensor that measures a fuel mass within the fuel tank.

3. The adaptive thermal management system as recited in claim 1, wherein the sensor assembly comprises an oxygen sensor measuring an oxygen content within the fuel.

4. The adaptive thermal management system as recited in claim 1, wherein the controller is configured to utilize a current engine operating condition in determining the capacity of the coolant to accept heat.

5. The adaptive thermal management system as recited in claim 1, wherein the controller is configured to utilize a current ambient operating condition in determining the capacity of the coolant to accept heat.

6. The adaptive thermal management system as recited in claim 1, wherein the controller is configured to stop flow of coolant to at least one heat generating system in response to the capacity of the coolant or accepting heat being outside the predefined range.

7. A gas turbine engine comprising:
a fan rotatable within a fan nacelle;
a core engine including a compressor communicating compressed air to a combustor where compressed air is mixed with fuel and ignited to generate a high-energy gas flow expanded through a turbine;
a fuel system including a fuel tank containing a mass of fuel and a fuel pump for generating a fuel flow;
a heat exchanger receiving a portion of fuel flow for transferring heat from at least one heat generating system into the fuel flow;
a temperature sensor measuring a temperature of the fuel;
a sensor assembly measuring a parameter of the fuel during operation of the gas turbine engine, the parameter measured by the sensor assembly is indicative of a capacity of the fuel to accept heat;
a control valve governing a flow of fuel into the heat exchanger; and
a controller adjusting the control valve to communicate fuel flow to the heat exchanger based on a determined capacity of the fuel to accept heat in view of the measured temperature of the fuel and that the measured parameter of the fuel is within a predefined range.

8. The gas turbine engine as recited in claim 7, wherein the measured parameter comprises an oxygen content of the fuel flow and the mass of fuel within the fuel tank.

9. The gas turbine engine as recited in claim 8, wherein the temperature sensor comprises a first temperature sensor measuring a temperature of the fuel mass within the fuel tank and a second temperature sensor measuring a temperature of fuel flow downstream of the fuel tank, wherein a difference between a temperature of the fuel mass and the fuel flow is indicative of the capacity of the fuel to accept heat.

10. The gas turbine engine as recited in claim 7, wherein the controller is configured to utilize a current engine operating condition in determining the capacity of the fuel to accept heat.

11. The gas turbine engine as recited in claim 10, wherein the controller is configured to stop flow of fuel to at least one heat generating system in response to the capacity of the fuel for accepting heat being outside the predefined range.

12. A method of actively managing thermal loads comprising:
measuring a current temperature of a fuel during operation of a gas turbine engine;
measuring a fuel mass contained within the fuel system in addition to the current temperature of the fuel during operation of the gas turbine engine;
determining that the measured fuel mass is within a predefined range in view of the measured temperature that is indicative of a capacity of the fuel to accept additional heat input; and
transferring heat into the fuel in response to the measured fuel mass being within the predefined range in view of the measured temperature.

13. The method as recited in claim 12, wherein the fuel is supplied to a combustor of the gas turbine engine through a fuel system and a portion of a flow of fuel is routed through a heat exchanger for transferring heat from another system into the fuel.

14. The method as recited in claim 13, further including measuring an oxygen content within the fuel and transferring heat into the fuel in response to the measured oxygen content within the fuel being within a predefined range.

15. The method as recited in claim 13, including determining a time in a flight cycle and adjusting the predefined range in view of the determined time in the flight cycle.

16. The method as recited in claim 13, including determining a heat load of a heat generating system and transferring a portion of the heat load to the fuel in response to a determination that the fuel has additional capacity for accepting heat without exceeding a predefined temperature.

17. The method as recited in claim 12, including stopping a transfer of heat into the fuel in response to a determination that the fuel mass or the temperature of the fuel is outside of the predefined range indicating that the fuel does not have a sufficient capacity to accept additional heat.

18. The method as recited in claim 17, including monitoring the temperature of the fuel and reinitiating the transfer of heat into the fuel in response to the temperature of the fuel being within the predefined range indicating the fuel has some capacity to accept additional heat.

* * * * *